US012755640B1

(12) United States Patent
Fehr et al.

(10) Patent No.: US 12,755,640 B1
(45) Date of Patent: Oct. 6, 2026

(54) SYSTEM AND METHOD FOR INTEROPERABLE AIR AND GROUND TRANSPORTATION COMMUNICATION AND COORDINATION

(71) Applicant: Airspace Experience Technologies, Inc. (ASX), Detroit, MI (US)

(72) Inventors: Walton Fehr, Mundelein, IL (US); Jon Rimanelli, Grosse Pointe Woods, MI (US); Brandon Hannawa, Bloomfield Hills, MI (US); Gary Gardella, Plymouth, MI (US)

(73) Assignee: Airspace Experience Technologies, Inc. (ASX), Detroit, MI (US)

( * ) Notice: Subject to any disclaimer, the term of this patent is extended or adjusted under 35 U.S.C. 154(b) by 0 days.

(21) Appl. No.: 19/332,263

(22) Filed: Sep. 18, 2025

(51) Int. Cl.
*G08G 5/55* (2025.01)
*G01C 5/06* (2006.01)
(Continued)

(52) U.S. Cl.
CPC ................ *G08G 5/55* (2025.01); *G01C 5/06* (2013.01); *G01C 21/20* (2013.01); *G08G 5/22* (2025.01);
(Continued)

(58) Field of Classification Search
CPC ... G08G 5/55; G08G 5/22; G08G 5/26; G01C 5/06; G01C 21/20; H04W 4/46; H04W 4/48
See application file for complete search history.

(56) References Cited

U.S. PATENT DOCUMENTS 8,972,159 B2 3/2015 Ferreira et al.
9,567,077 B2 2/2017 Mullan et al.
(Continued)

FOREIGN PATENT DOCUMENTS

EP 3251108 B1 12/2017
EP 3664479 B1 6/2020
EP 3970395 B1 3/2022

OTHER PUBLICATIONS

Dowd, Garrett. Improving Autonomous Vehicle Safety using Communications and Unmanned Aerial Vehicles. 2019. Ohio State University, Master's thesis. OhioLINK Electronic Theses and Dissertations Center, http://rave.ohiolink.edu/etdc/view?acc_num=osu1574861007798385.*

*Primary Examiner* — Brian P Sweeney
(74) *Attorney, Agent, or Firm* — Gardella Alciati

(57) ABSTRACT

A unified traffic management system may coordinate vehicles, drones, and infrastructure through secure communication and routing. In one embodiment, On-board units and Ground Stations exchange Basic Safety Messages and Traveler Information Messages, while servers process and display data in near-real time. On-board units may integrate GNSS, C-V2X radios, sensors, and processors to share position, and telemetry, with rotating IDs preserving privacy. Ground Stations may provide local connectivity and certificate management, forwarding data to edge computers and central servers. In one embodiment, the system maintains routes that reflect infrastructure, enforces geofences and restricted zones, and ensures safe speeds, separation, and intersection management. Transactions such as tolls or access control may be securely authenticated and logged. Commands may be delivered reliably via compressed traveler messages with acknowledgments. Applications may include airport coordination, urban logistics, and security
(Continued)

enforcement, demonstrating a scalable, privacy-preserving platform for unified air and ground transportation.

27 Claims, 18 Drawing Sheets

(51) Int. Cl.

| | |
|---|---|
| ***G01C 21/20*** | (2006.01) |
| ***G08G 5/22*** | (2025.01) |
| ***G08G 5/26*** | (2025.01) |
| ***H04W 4/46*** | (2018.01) |
| ***H04W 4/48*** | (2018.01) |

(52) U.S. Cl.

CPC ................ *G08G 5/26* (2025.01); *H04W 4/46* (2018.02); *H04W 4/48* (2018.02)

(56) References Cited

U.S. PATENT DOCUMENTS

| | | | | |
|---|---|---|---|---|
| 9,821,910 | B1 | 11/2017 | Suiter | |
| 10,269,255 | B2 | 4/2019 | High et al. | |
| 11,435,440 | B2 | 9/2022 | Slobodyanyuk et al. | |
| 11,473,913 | B2 | 10/2022 | Koubaa | |
| 11,930,124 | B2 | 3/2024 | Rimanelli et al. | |
| 12,013,707 | B2 | 6/2024 | Williams et al. | |
| 2023/0019827 | A1* | 1/2023 | Chen ...................... | G08B 25/10 |

* cited by examiner

500

800

1000

1700

1701

SYSTEM AND METHOD FOR INTEROPERABLE AIR AND GROUND TRANSPORTATION COMMUNICATION AND COORDINATION

BACKGROUND

Modern transportation ecosystems include a wide variety of air and ground vehicles, each relying on distinct communication and identification technologies. For example, uncrewed aerial vehicles (UAVs), or drones, commonly employ Bluetooth or Wi-Fi-based Remote ID systems operating in the 5.0 GHz and/or 2.4 GHz band. General aviation (GA) and commercial aircraft primarily rely on Automatic Dependent Surveillance-Broadcast (ADS-B) systems and Mode A/C/S transponders operating at 1090 MHz or 978 MHz for air traffic control and collision avoidance. Autonomous ground vehicles have adopted Dedicated Short-Range Communications (DSRC) or cellular-based vehicle-to-everything (C-V2X or LTE-V2X) protocols to support vehicle-to-vehicle and vehicle-to-infrastructure communications. Many conventional ground vehicles and stationary infrastructure, however, lack standardized communication systems altogether, often relying on visual signals or proprietary solutions.

These disparate systems operate in isolation, creating fragmentation and incompatibility across air and ground transportation modes. Such fragmentation poses multiple challenges. First, it presents significant safety risks, including mid-air collisions, runway incursions, and other incidents resulting from an inability of aircraft, drones, and ground vehicles to communicate with one another directly. Second, it leads to inefficiencies in traffic management. For example, Uncrewed Traffic Management (UTM) systems used for drones typically operate independently of Air Traffic Control (ATC) systems, while smart city infrastructures for ground vehicles often lack integration with aviation systems. Third, scalability in dense environments is hindered, as short-range systems such as Wi-Fi/Bluetooth become unreliable in congested airspace, and ADS-B channels risk saturation in crowded aviation corridors.

Further, economic and regulatory challenges exacerbate the problem. Equipment costs for aviation systems such as ADS-B are often prohibitive for general aviation pilots, while manufacturers are forced to develop redundant systems for different vehicle classes, increasing development costs. Regulatory authorities also struggle to harmonize fragmented standards across international jurisdictions, complicating global interoperability.

Accordingly, there is a need for a universal communication and identification system that seamlessly connects air vehicles, ground vehicles, stationary objects and infrastructure. Such a system should improve coordination in traffic management, enhance safety across transportation modes, reduce equipment and development costs, and provide a standardized framework capable of supporting future growth in advanced air mobility and smart city environments.

SUMMARY OF ILLUSTRATIVE EMBODIMENTS

In one embodiment, a unified traffic management system coordinates vehicles, drones, and infrastructure through secure communication and routing. In one embodiment, On-board units (OBUs) and Ground Stations exchange Basic Safety Messages (BSMs) and Traveler Information Messages (TIMs), while servers process, store, and display data in near-real time. In one embodiment, functions include maintaining routes that reflect infrastructure and community preferences, enforcing geofences and restricted zones, and ensuring safe speeds, separation, and conflict-free passage at intersections. In one embodiment, combining secure message handling, dynamic identifiers, and coordinated routing, enables scalable, privacy-preserving transportation across air and ground domains.

In one embodiment, OBUs integrate a Global Navigation Satellite System (GNSS), C-V2X radios, system-on-chips (SOCs), barometric sensors, Wi-Fi/Bluetooth, flight-controller interfaces, and power. The GNSS may provide position, time, and inertial measurements, while the C-V2X radio exchanges BSMs and TIMs, requests Security Credential Management System (SCMS) certificates, rotates identifiers, and manages encryption. The SOC may process sensor data, calculates altitude, encodes/decodes ASN.1 messages, manages obstacle vectors, and connects with flight controllers via Micro Air Vehicle Link (MA VLink). Wi-Fi/Bluetooth may support Remote ID compliance, detect unregistered devices, and connect to users, while OBU mesh networking enables cooperative collision avoidance. In some embodiments, ADS-B radios enhance detection. Integrated data may be broadcast over C-V2X or DSRC and stored in the traffic management system.

In one embodiment, Ground Stations are compact units with GNSS, C-V2X radios, SOCs, Wi-Fi/Bluetooth, internet backhaul, and power. They may exchange BSMs, TIMs, MAPs, SPATs, and GPS corrections, manage certificate provisioning, and forward telemetry to edge computers and central servers. The SOC may decode messages, integrate sensors, manage rotating IDs, and encode outgoing traffic, while Wi-Fi/Bluetooth may detect uncooperative devices. Connectivity ensures synchronization with servers and updates to the database. In some cases, Ground Stations also include ADS-B and access-control systems.

In one embodiment, OBUs continuously transmit BSMs containing GPS, inertial, pressure, and telemetry data, describing position, speed, direction, and other information. Ground Stations may forward these cryptographically signed messages to edge computers for de-duplication and normalization before storage. OBUs may also manage rotating IDs to protect privacy, with frequent updates linked securely to permanent identifiers at the server. The system may validate and authorize vehicles in near-real-time while preventing unauthorized correlation.

In one embodiment, the server manages data flows, visualization, and client control. Users and vehicles may be registered with classifications that determine access privileges. Vehicle data (e.g. identifiers, sensors, ownership, and failsafes) may be stored and cross-referenced with BSMs for tracking. Users can define routes and geofences, while the system maintains a master set of routes that respects infrastructure and community preferences and avoids restricted zones. Routes may direct vehicles under rules enforcing speed, separation, and intersection safety. Geofences may be expressed as two- or three-dimensional boundaries, visualized in the interface, and enforced by comparing live BSMs to stored definitions. Approaching restricted areas may trigger warnings, route changes, or control commands.

In one embodiment, transactions occur through secure exchanges between OBUs and infrastructure. Services such as tolls, parking, or access control may be announced by facilities, authenticated by OBUs, and completed with encrypted records forwarded to back-office systems. This provides a scalable, standardized framework for vehicle to facility interactions. In one embodiment, TIMs are transmitted as MAVLink payloads. Clients may generate TIMs with OBU identifiers and compressed commands, which Ground Stations forward to the target OBU. If matched, the OBU decodes the command, executes it via the flight controller, and returns acknowledgments via a BSM or SRM. Ground Stations may confirm receipt, or retransmit if necessary, ensuring reliable and traceable execution with minimal redundancy.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Figure 1:
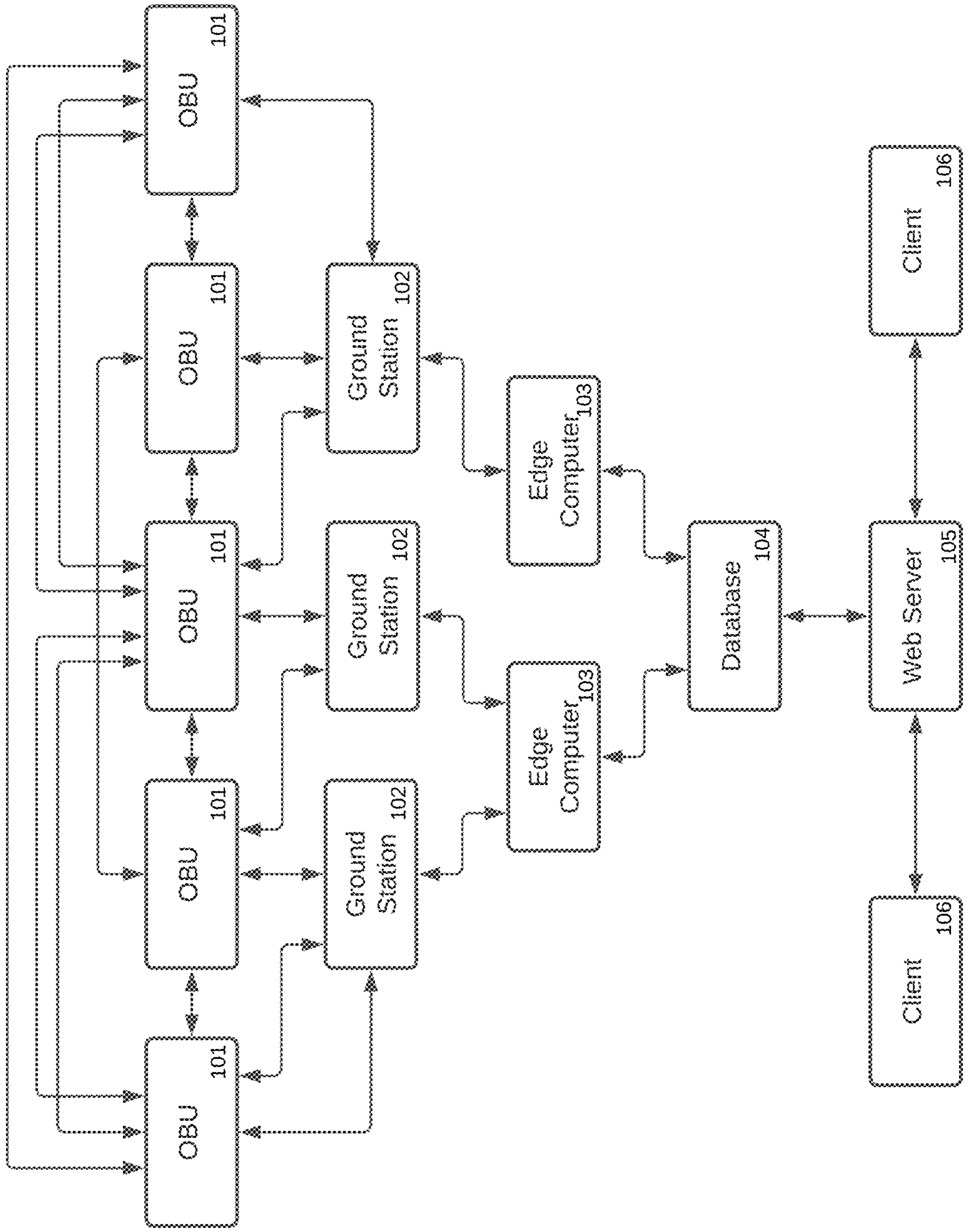
FIG. 1 is a high-level diagram showing units of a UTM system.
Figure 2:
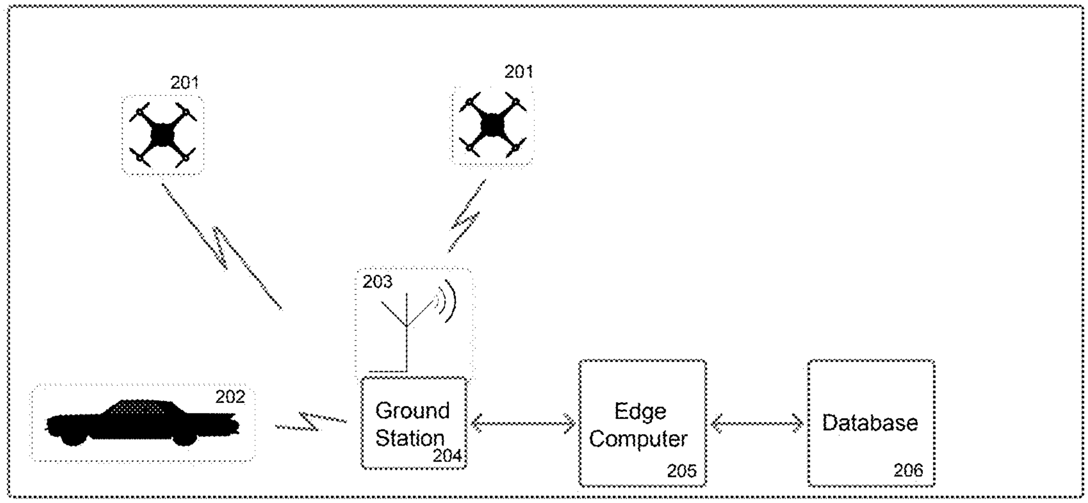
FIG. 2 illustrates communication between units of a UTM system.

In one embodiment, a communication and coordination system comprises OBUs 101, Ground Stations 102, edge computers 103, a central database 104, a web server 105, and one or more client devices 106. See FIG. 1. The system spans across both fixed infrastructure and mobile environments, enabling interactions between moving entities and stationary elements. The OBUs, which are mounted on aerial vehicles, ground vehicles, or carried by individuals, are configured to communicate with one another as well as with Ground Stations located within communication range, typically between approximately 300 meters and 1.5 kilometers depending on the medium of the environment. FIG. 2 shows two aerial vehicles 201 connected to a Ground Station 204. A ground vehicle 202 is connected to the same Ground Station 204. Ground Stations are operatively connected to both OBUs and edge computers 205, enabling localized data aggregation and processing. Edge computers communicate with one or more Ground Stations to provide efficient handling of data within clusters of activity and are coupled to a central database 206 that stores and organizes system-wide information. The central database is connected to a web server, which facilitates access to the stored data by multiple client devices. Client devices 106 are comprised of processing circuitry, memory, a power source, and a radio and/or internet connection for communicating with the web server 105. In one embodiment, a client device is a computing device. In another embodiment, a client device is a mobile smart phone. In another embodiment, a client device is a remote controller.

Figure 3:
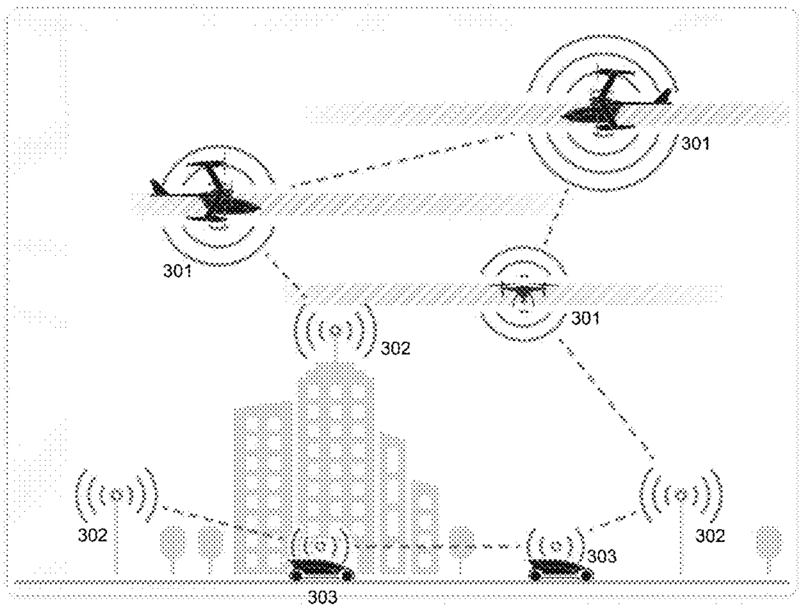
FIG. 3 illustrates communication between air and ground vehicles with Ground Stations.
Figure 4:
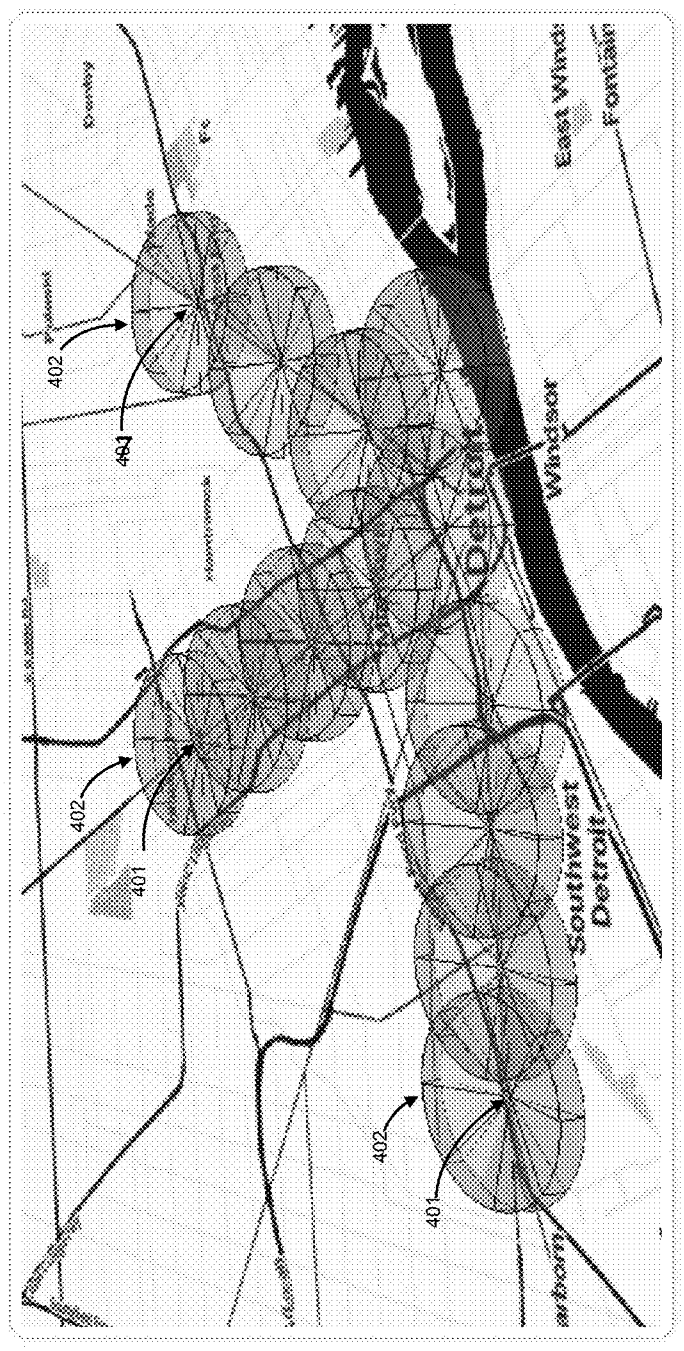
FIG. 4 is a diagram showing the distribution of multiple Ground Stations and their communication ranges.

FIG. 3 shows another diagram with various types of aerial vehicles 301 and ground vehicles 303 connected to Ground Stations 302. OBUs mounted on vehicles may communicate with each other as well, connecting to Ground Stations 302 through a mesh network. FIG. 4 shows a distribution of Ground Stations 401. Their communication ranges 402 are represented by cylinders around each Ground Station. This architecture provides distributed data processing at the edge while maintaining centralized storage and client accessibility, thereby supporting scalable and efficient communication across mobile and fixed domains for applications including traffic management, safety monitoring, and coordinated mobility operations.

On-Board Unit

Figure 5:
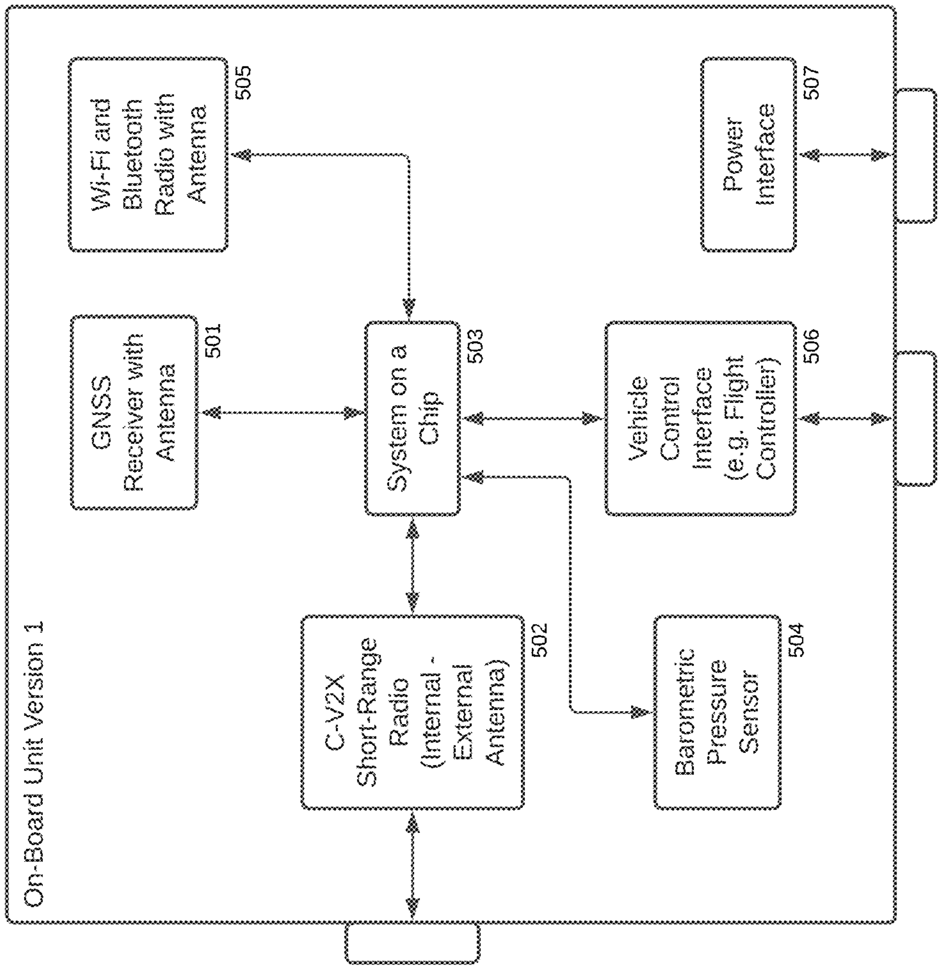
FIG. 5 is a high-level diagram showing components of a first embodiment of an OBU.
Figure 6:
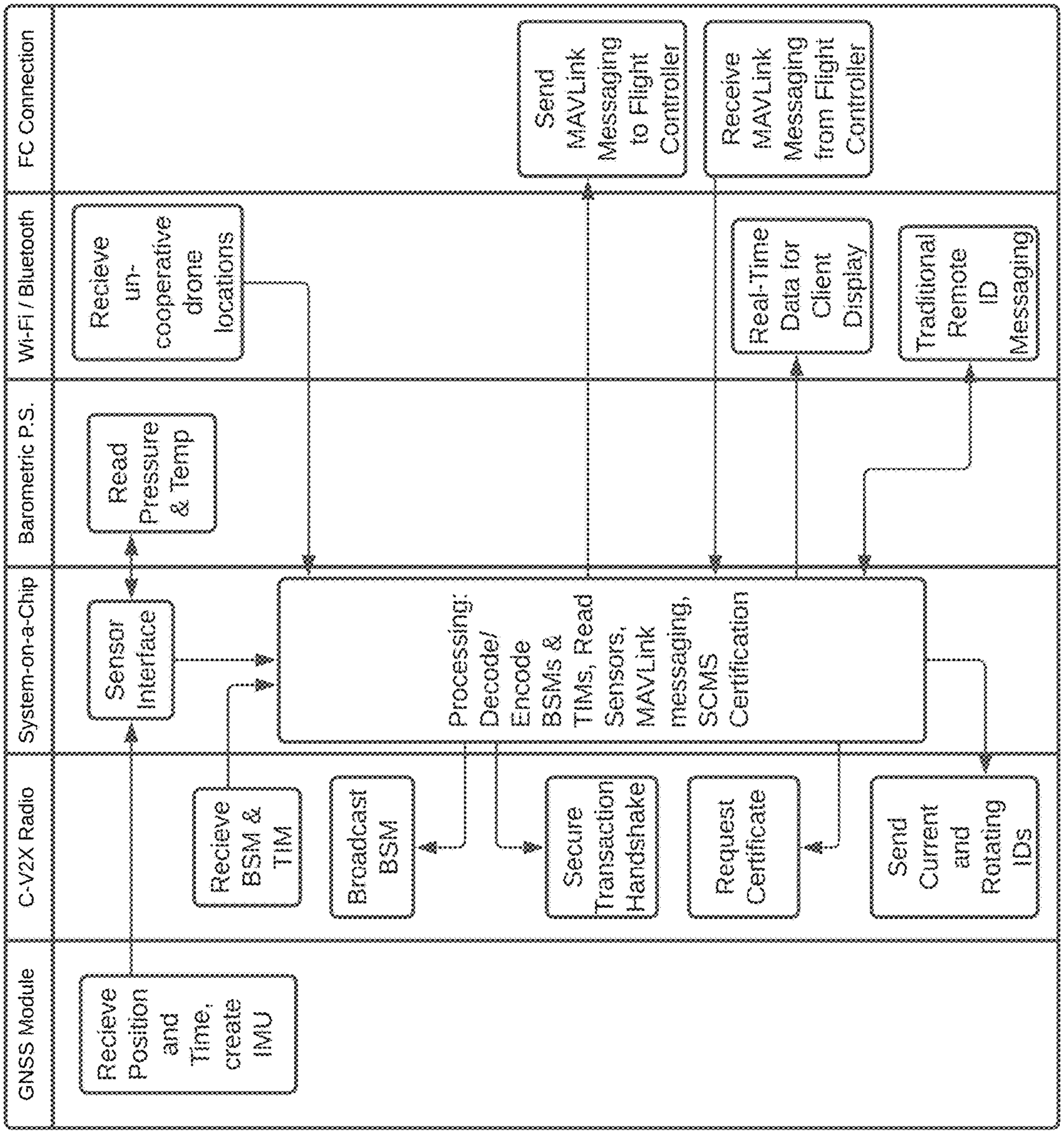
FIG. 6 is a diagram showing high-level data flow between components of a first embodiment of an OBU.

In one embodiment, an OBU 500 comprises a GNSS module 501, a C-V2X radio 502, an SOC 503, a barometric pressure sensor 504, a Wi-Fi/Bluetooth transceiver 505, a flight controller (FC) connection 506, and a power source interface 507. See FIG. 5. The GNSS module 501 receives position and time data and produces inertial measurement unit (IMU) data for dead reckoning, with such data being communicated to a sensor interface of the SOC 503. See FIG. 6 for data flow processes between the components of the OBU. In one embodiment, the OBU 500 is mounted to an aerial vehicle. In another embodiment, the OBU 500 is mounted to a ground vehicle.

In one embodiment, the C-V2X radio 502 receives incoming BSMs and TIMs transporting MAVLink messages or elements of MAVLink messages within text strings, which are provided to the SOC 503 for further processing. The C-V2X radio 502 also transmits BSMs to other OBUs and Ground Stations, engages in handshake protocols to establish trust prior to exchanging secure transaction information in accordance with J3217 standards, requests certificates from Ground Stations, and sends encrypted messages at periodic intervals in coordination with a rotating identifier managed by a UTM system. In one embodiment, MAVLink messages control travel for aerial vehicles. In an alternative embodiment, MAVLink messages control travel for ground vehicles.

In one embodiment, the SOC 503 is operatively coupled to the GNSS module 501 and the barometric pressure sensor 504, the latter of which provides pressure and temperature readings to the SOC sensor interface. Both the GNSS module 501 and the barometric pressure sensor 504 provide altitude and height measurements to the OBU. GNSS measurements are commonly used for ground transportation, which requires accurate two-dimensional awareness. While the GNSS module 501 provides altitude measurements, it is not accurate and may be off by as much as 100 feet. This level of accuracy is not useful when coordinating traffic between aerial vehicles. The addition of a barometric pressure sensor 504 provides more accurate altitude, allowing aerial vehicles to navigate terrain, and fly above and below other aerial vehicles in coordinated routes and intersections.

The SOC 503 manages all OBU-level processing, including decoding and processing ASN.1 data structures (e.g. BSMs and TIMs), reading sensor data (GPS, barometric pressure sensor, IMU, and thermometer), calculating altitude and height above ground level (AGL) or mean sea level (MSL), encoding and transmitting BSMs, calculating collision avoidance maneuvers based on foreign BSMs, Remote ID signals, and ADS-B transmissions, managing MAVLink connections and messaging, and provisioning digital certificates through an SCMS. To support certificate provisioning, the SOC communicates with Ground Stations to obtain signed SCMS certificates, which serve as digital identifiers.

In one embodiment, the Wi-Fi/Bluetooth transceiver 505 is configured to receive Remote ID messages from drones operating outside of the UTM system, such as uncooperative drones or other airborne objects, and to broadcast Remote ID messages to comply with regulations and facilitate communication with vehicles and objects operating on legacy Remote ID systems. The Wi-Fi/Bluetooth transceiver 505 may also transmit real-time data to connected user interface devices such as tablets and smartphones.

Figure 7:
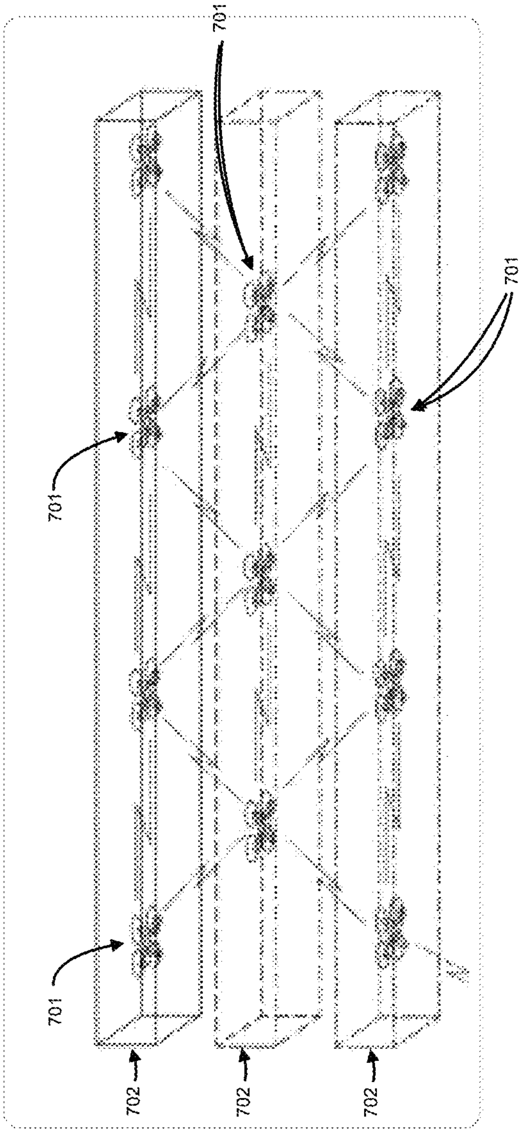
FIG. 7 is an illustration of multiple air vehicles in communication.

In one embodiment, the OBU comprises a Vehicle Control Interface 506 or FC connection interface. The OBU is configured to send and receive travel commands, MAVLink messages to and from a flight controller, including route data, geofence definitions, obstacle locations, avoidance information, messaging, GPS data, and pressure data, while also transmitting MAVLink messages and acknowledgements. FIG. 7 shows an illustration of multiple aerial vehicles 701 equipped with OBUs. By communicating with each other, the vehicles form a mesh network, allowing them to coordinate routes and avoid collisions. In this image, the vehicles have also formed three distinct channels 702 for orderly travel. In one embodiment, MAVLink messages control travel for aerial vehicles. In an alternative embodiment, MAVLink messages control travel for ground vehicles.

Figure 8:
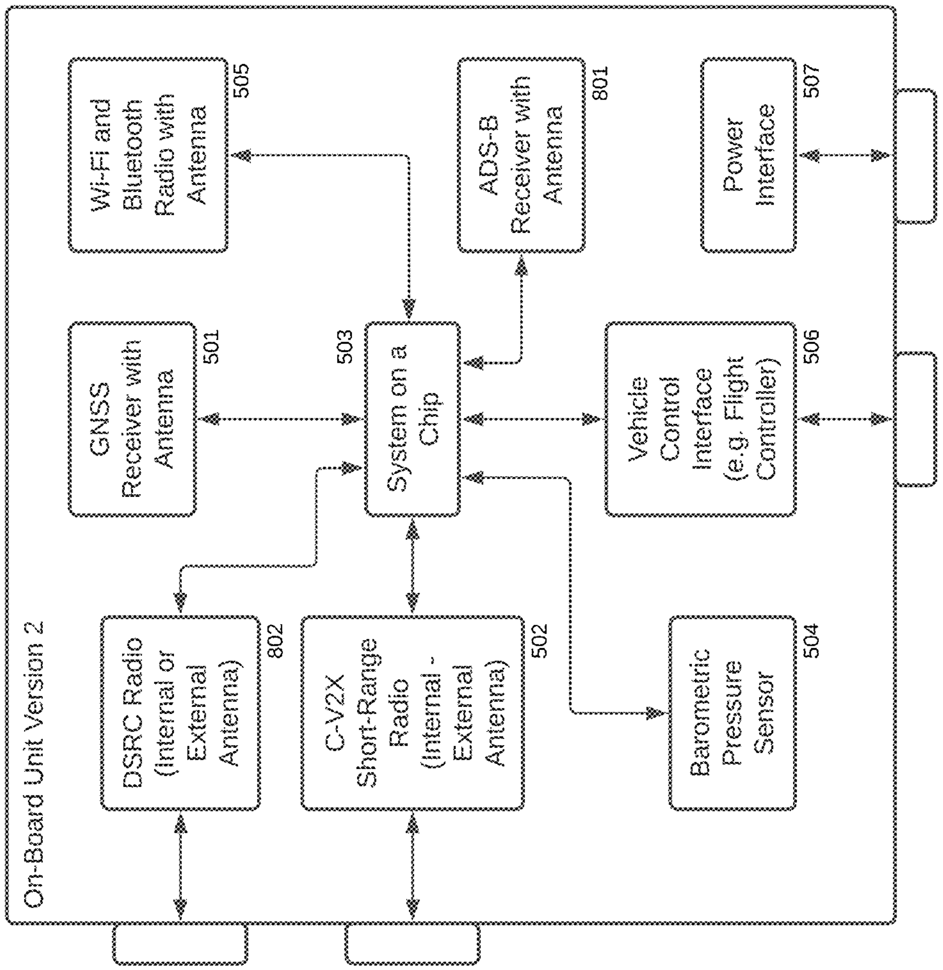
FIG. 8 is a high-level diagram showing components of a second embodiment of an OBU.
Figure 9:
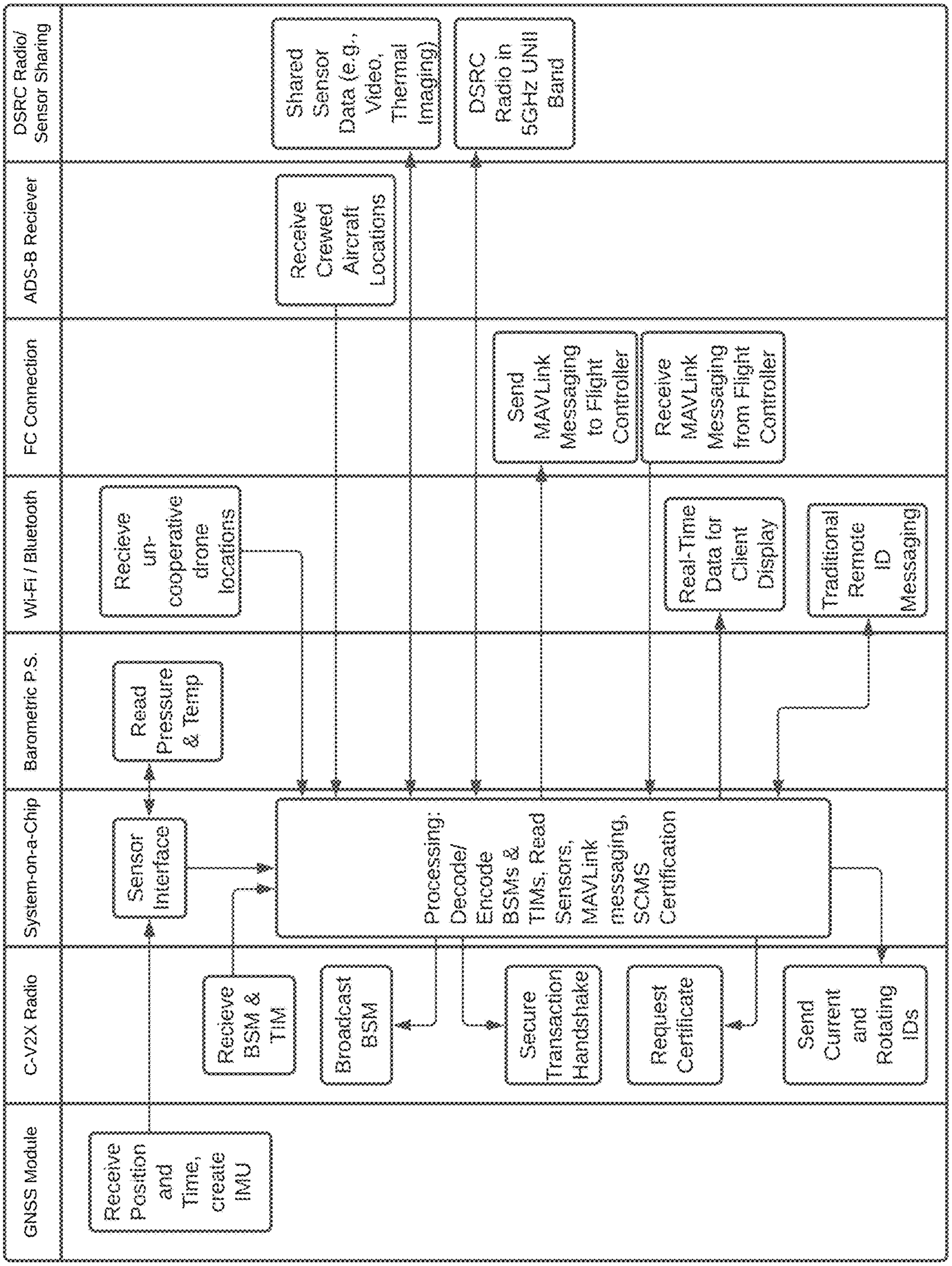
FIG. 9 is a diagram showing high-level data flow between components of a first embodiment of an OBU.
Figure 10:
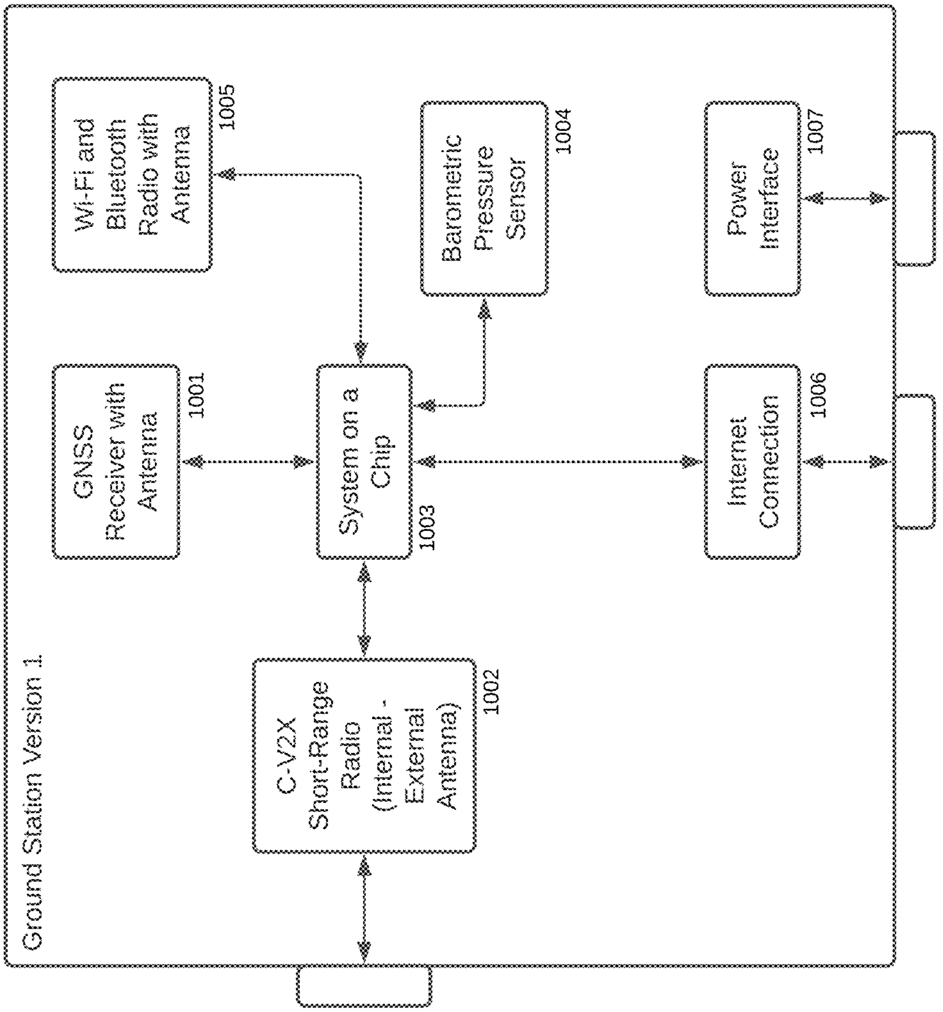
FIG. 10 is a high-level diagram showing components of a first embodiment of a Ground Station.

In an alternative embodiment, the OBU 800 further comprises an ADS-B receiver 801 and a DSRC radio 802. See FIG. 8. The ADS-B receiver 801 is configured to receive broadcast signals from manned aircraft, thereby providing positional awareness of conventional aviation traffic to enhance collision avoidance and overall airspace coordination. The DSRC radio 802 operates within the 5 GHz UNII band and is configured to transmit and receive shared sensor data, including but not limited to video streams, thermal images, and other high-bandwidth environmental information. See FIG. 9 for data flow processes between the ADS-B receiver 801 and DSRC radio 802 with the other components of the OBU. In one embodiment, the OBU 800 is mounted to an aerial vehicle. In another embodiment, the OBU 800 is mounted to a ground vehicle.

Both the ADS-B receiver 801 and DSRC radio 802 are operatively connected to the SOC 503, which decodes, processes, and integrates the received data with other OBU inputs, such as GNSS 501, barometric pressure sensor 504, C-V2X Radio 502, and Wi-Fi/Bluetooth transceiver 505. Through this integration, the SOC is able to generate a unified situational picture that incorporates manned aircraft positions, cooperative vehicle data, and shared sensor feeds. The SOC further encodes and disseminates relevant outputs through the C-V2X radio, Wi-Fi/Bluetooth transceiver, and flight controller connection, thereby extending the OBU's capacity to support safety, navigation, and coordinated mobility operations across both air and ground transportation modes.

Ground Station

In one embodiment, a Ground Station 1000 is comprised of a GNSS module 1001, a C-V2X radio 1002, an SOC 1003, a barometric pressure sensor 1004, a Wi-Fi/Bluetooth transceiver 1005, an internet connection 1006, and a power source interface 1007. In one embodiment, the Ground Station 1000 is designed to be compact, lightweight, and capable of operating on battery power charged by a solar cell, enabling flexible deployment in both urban and rural settings. For backhaul connectivity, a cellular modem may be utilized in place of or in addition to wired internet.

Figure 11:
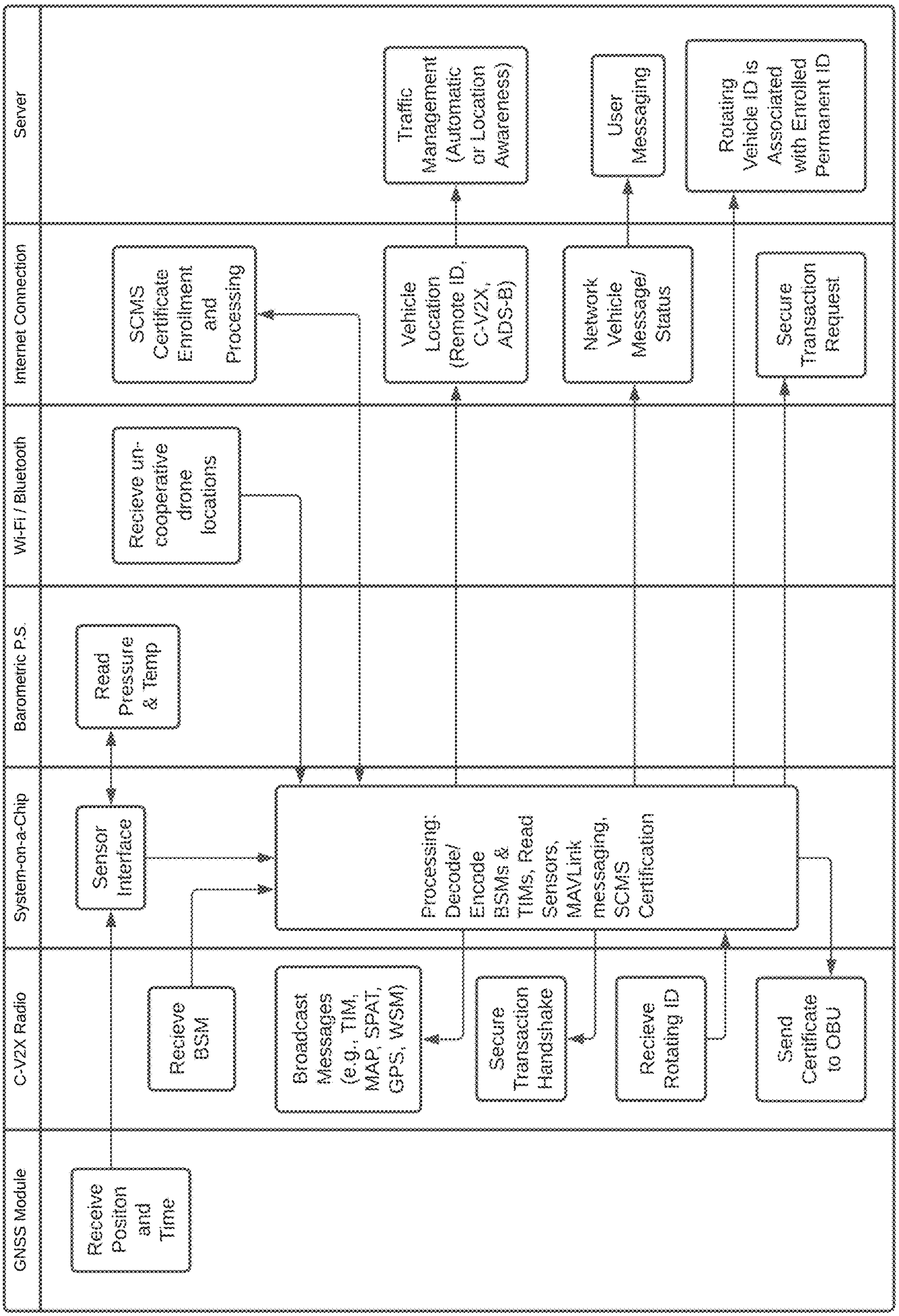
FIG. 11 is a diagram showing high-level data flow between components of a first embodiment of a Ground Station.

In one embodiment, the GNSS module 1001 receives position and time data and provides this information to the SOC 1003 for processing and synchronization with other system components. See FIG. 11 for data flow processes between the components of the Ground Station 1001. The C-V2X radio 1002 receives incoming BSMs, such as OBU locations and MAVLink acknowledgements, and relays these messages to the SOC 1003 for processing. The C-V2X radio 1002 also receives broadcast messages, including TIMs, MAP messages (SAE J2735) conveying geometric details of intersections and roadways, Signal Phase and Timing (SPAT, SAE J2734) messages representing traffic signal states, GPS correction data, and WAVE Short Messages (WSMs) advertising available services at the Ground Station 1000. To maintain secure communications, the C-V2X radio 1002 establishes handshakes with OBUs, exchanges secure transaction data, receives rotating IDs, and transmits signed SCMS certificates to enrolled OBUs.

In one embodiment, the SOC 1003 functions as the primary processing unit of the Ground Station 1000, receiving data from the GNSS module 1001, barometric pressure sensor 1004, C-V2X radio 1002, and internet connection 1006. The SOC 1003 decodes incoming BSMs and other broadcast messages, calculates collision avoidance maneuvers from foreign BSMs, Remote-ID, and ADS-B data, and computes altitude relative to mean sea level (MSL) and altitude above ground level (AGL). In one embodiment, the addition of a barometric pressure sensor 1004 in the Ground Station provides additional reference measurements to aid aerial vehicle flight routing and coordination. Barometric pressure readings at Ground Stations are relayed to OBUs, providing a reference for the OBU's SOC 503 to calculate more accurate altitude. These calculations are based on barometric pressure readings at the OBU and the Ground Stations. In one embodiment, the pressure readings at multiple Ground Stations are coordinated to provide precise regional pressure variations, and therefore more exact altitude calculations for OBUs in range. The altitude calculations at Ground Stations may also be enhanced by calculations of barometric pressure at sea level, from a weather service or an additional Ground Station placed at sea level.

In one embodiment, the SOC 1003 encodes and transmits TIMs, MAPs, SPATs, GPS corrections, WSMs, and MAVLink messages to OBUs within communication range. It also provides SCMS certificates, manages rotating IDs, and communicates with the UTM system to correlate rotating IDs with permanent IDs of registered vehicles. The SOC 1003 integrates sensor data from the barometric pressure sensor 1004 and GNSS module 1001 to improve environmental modeling and navigation accuracy, ensuring that processed data is consistently available for secure transmission and operational coordination.

In one embodiment, the barometric pressure sensor 1004 measures atmospheric pressure and temperature, providing these readings to the SOC 1003 for integration with GNSS data and environmental modeling. The Wi-Fi/Bluetooth transceiver 1005 receives Remote-ID broadcasts from drones or other devices operating outside of the UTM system, detecting uncooperative or unregistered traffic. In certain configurations, the Wi-Fi/Bluetooth transceiver 1005 also functions as a WiMAX-like link, enabling multiple Ground Stations to share a single internet connection and providing an alternative to provisioning each station with an independent cellular or fiber backhaul.

In one embodiment, the internet connection 1006 facilitates communication between the Ground Station 1000 and external systems. It supports SCMS certificate enrollment, updates, and management for both the Ground Station 1000 and OBUs. It also transmits location and identification information derived from Remote-ID, C-V2X 1002, and ADS-B to the server 105, which forwards the data throughout the UTM system. The internet connection 1006 communicates vehicle messaging, status updates, and secure transaction requests to users while ensuring synchronization between distributed system components.

In one embodiment, the server 105 operates the UTM system and performs centralized control and coordination. The server manages traffic across multiple modes, organizes user messaging, maintains facility records, and associates rotating IDs with permanent IDs within 100 to 200 milliseconds, enabling near-real-time identification and trust management. The server determines whether authorized vehicles are entering or leaving defined activation zones, updates access records, executes secure transactions, and vets participating OBUs and clients. In the event of non-compliance or detected security risks, the server can revoke access or terminate OBU participation.

Figure 12:
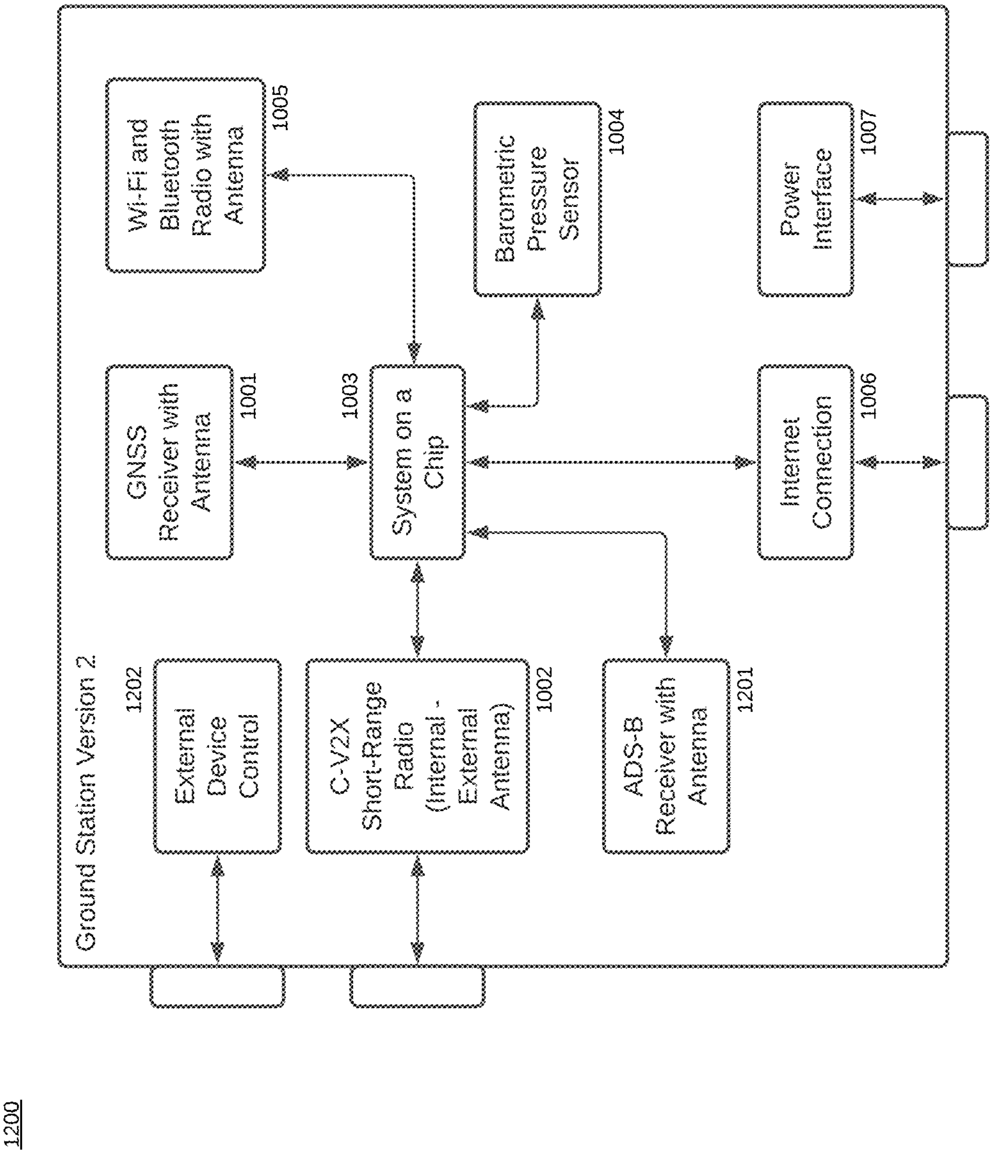
FIG. 12 is a high-level diagram showing components of a second embodiment of a Ground Station.
Figure 13:
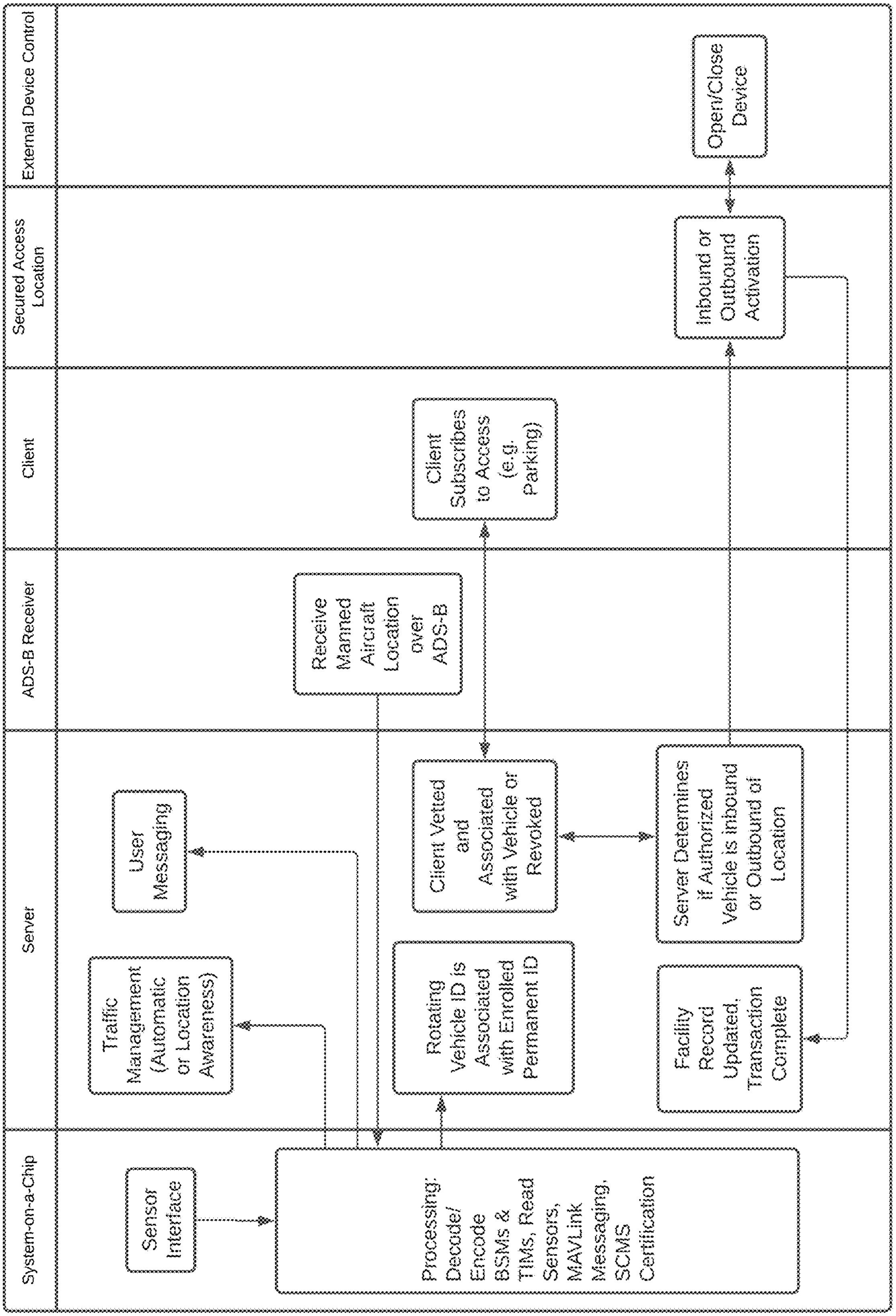
FIG. 13 is a diagram showing high-level data flow between components of a second embodiment of a Ground Station.

In another embodiment, a Ground Station 1200 further facilitates a secured access location service. See FIG. 12. This embodiment adds an ADS-B receiver 1201, a secured access location, an external device control (e.g. gate control) 1202 system, and a client interface. The ADS-B receiver 1201 is configured to receive location data from manned aircraft equipped with ADS-B, enabling the Ground Station 1200 to track incoming and outgoing traffic in the vicinity of the secured access location. See FIG. 13 for data flow processes regarding a secured access location service.

In one embodiment, the secured access location service is configured to control inbound and outbound access. The external device control 1202 system operates in coordination with the secured access location service to open and close the associated gate, permitting authorized aircraft or vehicles to enter or exit the facility. The client interface provides a local instance of the UTM system, allowing users to subscribe to and manage the secured access location service. Through this interface, authorized users can request gate access, monitor the status of the secured access location, and receive real-time updates regarding vehicle or aircraft activity within the controlled zone.

Because small aircraft are highly sensitive to local environmental conditions, reliance on only macro-scale weather sources may be insufficient for safe operation. Localized airflow can be significantly affected by surrounding structures, terrain, and other environmental obstacles, resulting in conditions that differ from regional forecasts. To address this, in one embodiment, OBUs installed on aerial vehicles cooperate with Ground Stations to obtain and utilize micro-weather information.

In one embodiment, a Ground Station is located at a critical site, such as a launch or landing area, to provide both reliable communication and localized weather awareness. In one embodiment, the Ground Station is paired with a compact weather station configured to measure wind speed and wind direction. In another embodiment, the weather station further measures precipitation and additional microclimate conditions. The integration of weather sensing capabilities into the Ground Station allows the UTM system to capture real-time micro-weather data, enabling automated adjustments to routing, procedures, and vehicle control based on measured conditions.

In one embodiment, precision weather information collected at Ground Stations is used to broadcast safe and efficient arrival and departure routes. This functionality is particularly critical during launch and landing operations, where small shifts in wind direction caused by nearby structures may influence flight performance. In one embodiment, the system includes an algorithm that automatically converts measured wind speed and direction into appropriate arrival and departure procedures. For example, if the prevailing wind is from the west, the algorithm may broadcast an arrival procedure from the east to ensure a headwind approach. In another embodiment, the system broadcasts alternative landing zones to accommodate emergency situations, further enhancing operational safety and flexibility.

Rotating ID

In one embodiment, an OBU implements a rotating pseudo-anonymous identification system ("Rotating ID") that provides both security and privacy during vehicle communications. The Rotating ID system resides locally within the OBU and interfaces directly with the C-V2X radio 502. During operation, the OBU transmits BSMs or Collective Perception Messages (CPMs) containing a Rotating ID rather than the OBU's permanent identifier. This approach ensures that the permanent ID is never exposed in broadcast messages, protecting user privacy while enabling secure communications.

In one embodiment, each OBU is provisioned with a permanent, unique private ID and cryptographic material for signing and encrypting transmitted data. The OBU generates a new Rotating ID at regular intervals, and each BSM contains the current Rotating ID. In one embodiment, to maintain trust and enable authorized tracking, the OBU periodically sends an encrypted message to the UTM or server, including both the permanent ID and the currently active Rotating ID. In one embodiment, the OBU generates a new Rotating ID every 100 milliseconds, transmitting the updated Rotating ID in each corresponding BSM. This communication leverages the capabilities of SAE standards J2735 and J3217 and may be further refined with future releases of 3GPP standards.

In one embodiment, at the server or UTM, the Rotating ID is correlated with the OBU's permanent ID, enabling authorized systems to associate real identities with pseudo-anonymous broadcasts for operational, regulatory, and safety purposes. The Rotating ID is integrated with identity and telemetry data packaged into BSMs or CPMs, which are broadcast over the 5.9 GHz ITS band. These messages are received by nearby C-V2X-enabled devices, regardless of vehicle type, and are further integrated into ATC, UTM, and smart city platforms.

In one embodiment, this system enables real-time, secure, and anonymous communication between OBUs and surrounding infrastructure, supporting scalable coordination in mixed air-ground environments and enhancing both safety and privacy without compromising operational integrity.

In an alternative embodiment, the Rotating ID system includes dynamic certificate renewal and multi-tier anonymity features to further enhance security and privacy. In this embodiment, the OBU periodically requests updated cryptographic certificates from a trusted authority, such as a Ground Station or the UTM, ensuring that both the Rotating ID and associated security credentials remain valid and resistant to compromise over time.

In one embodiment, the system implements multi-tier anonymity, in which different types of broadcasts carry Rotating IDs with varying levels of identifiability depending on operational context. For example, BSMs transmitted in congested urban environments may use higher-frequency Rotating ID changes to increase privacy, whereas messages intended for coordination with critical infrastructure or regulatory systems may include additional authentication data to allow rapid correlation with the permanent ID.

Additionally, one alternative embodiment allows integration of the Rotating ID with enhanced telemetry and sensor data, such that OBUs can selectively disclose location, speed, or operational status in encrypted form to authorized entities while maintaining anonymity for other nearby devices. The system may also support future 3GPP releases or additional cryptographic protocols, enabling backward and forward compatibility and ensuring long-term viability in evolving air-ground traffic ecosystems.

Vehicle Tracking Through BSMs

Figure 14:
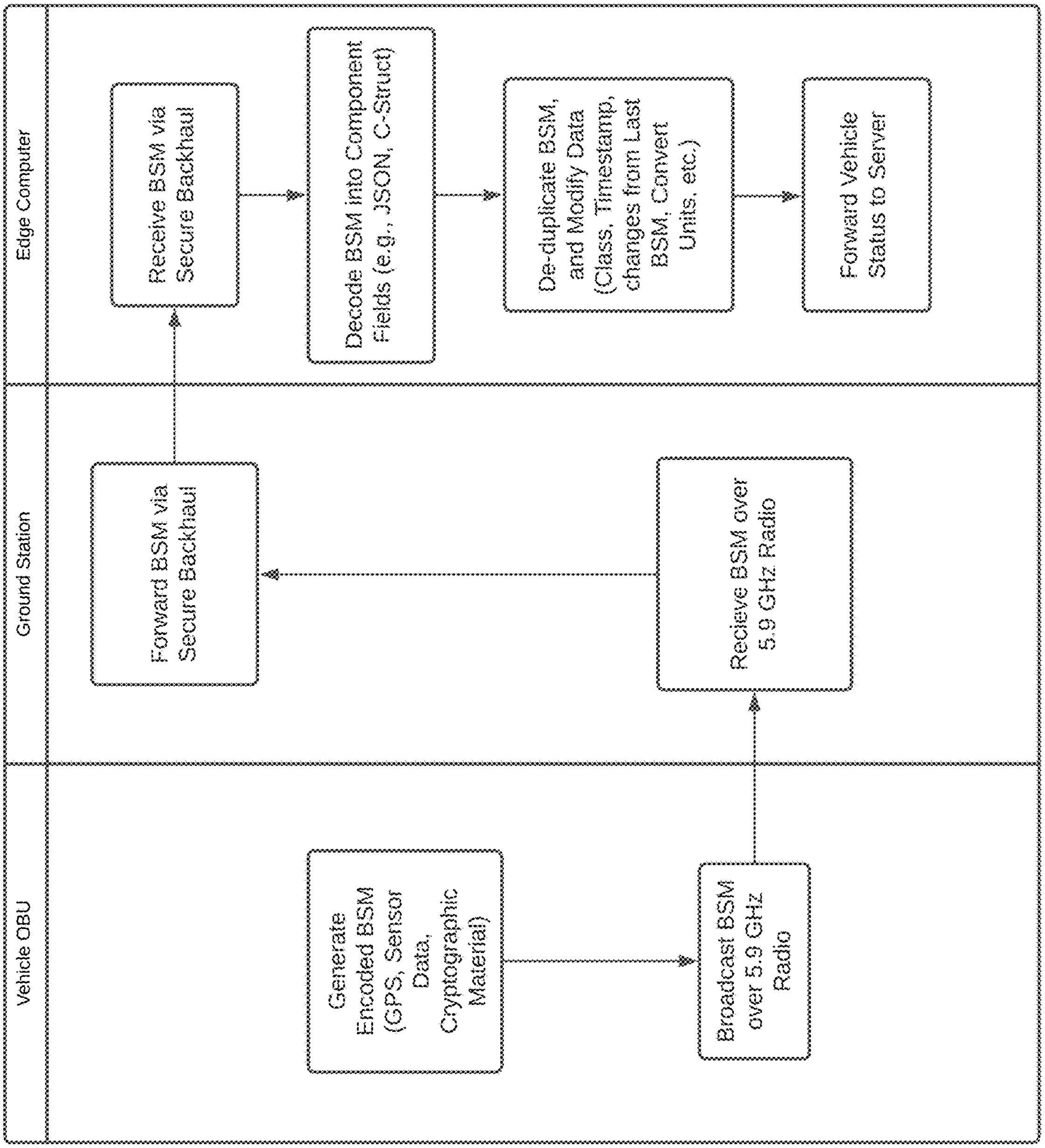
FIG. 14 is diagram showing high-level data flow of vehicle tracking with BSMs.

In one embodiment, vehicle tracking is facilitated through the continuous broadcast and processing of BSMs. See FIG. 14. An OBU associated with a vehicle or other device generates an encoded BSM by combining GPS data with onboard sensor inputs, such as pressure readings, inertial measurement unit (IMU) data, and other telemetry, along with cryptographic material for authentication. In one example, the BSM is encoded using Abstract Syntax Notation One (ASN.1). The resulting message encapsulates essential information including vehicle location, direction, speed, acceleration, timestamp, and classification (e.g., drone, car, or truck). Once generated, the BSM is broadcast over the 5.9 GHZ ITS band to nearby receivers.

In one embodiment, a Ground Station within communication range receives the BSM broadcast through its C-V2X radio. The Ground Station forwards the BSM to an edge computer over a secure backhaul connection, which may include cellular, fiber, satellite, or other links. The secure backhaul preserves both the integrity and confidentiality of the transmitted data.

In one embodiment, at the edge computer, the incoming encoded BSM is decoded into structured data formats, such as JSON or C-Struct representations. When multiple Ground Stations receive the same BSM broadcast, the edge computer performs de-duplication to eliminate redundant data entries, thereby ensuring that each BSM is processed only once. This improves overall efficiency and reduces unnecessary network traffic.

In one embodiment, after decoding and de-duplication, the edge computer further processes the BSM data by normalizing fields and preparing the data for ingestion into the database. Core information, such as vehicle position, heading, velocity, and classification, is retained and may be supplemented with time derivatives or other contextual metrics. The processed data is then forwarded securely to a central database and server, where it is stored, analyzed, and integrated into the UTM for operational coordination.

Server Operations

Figure 15:
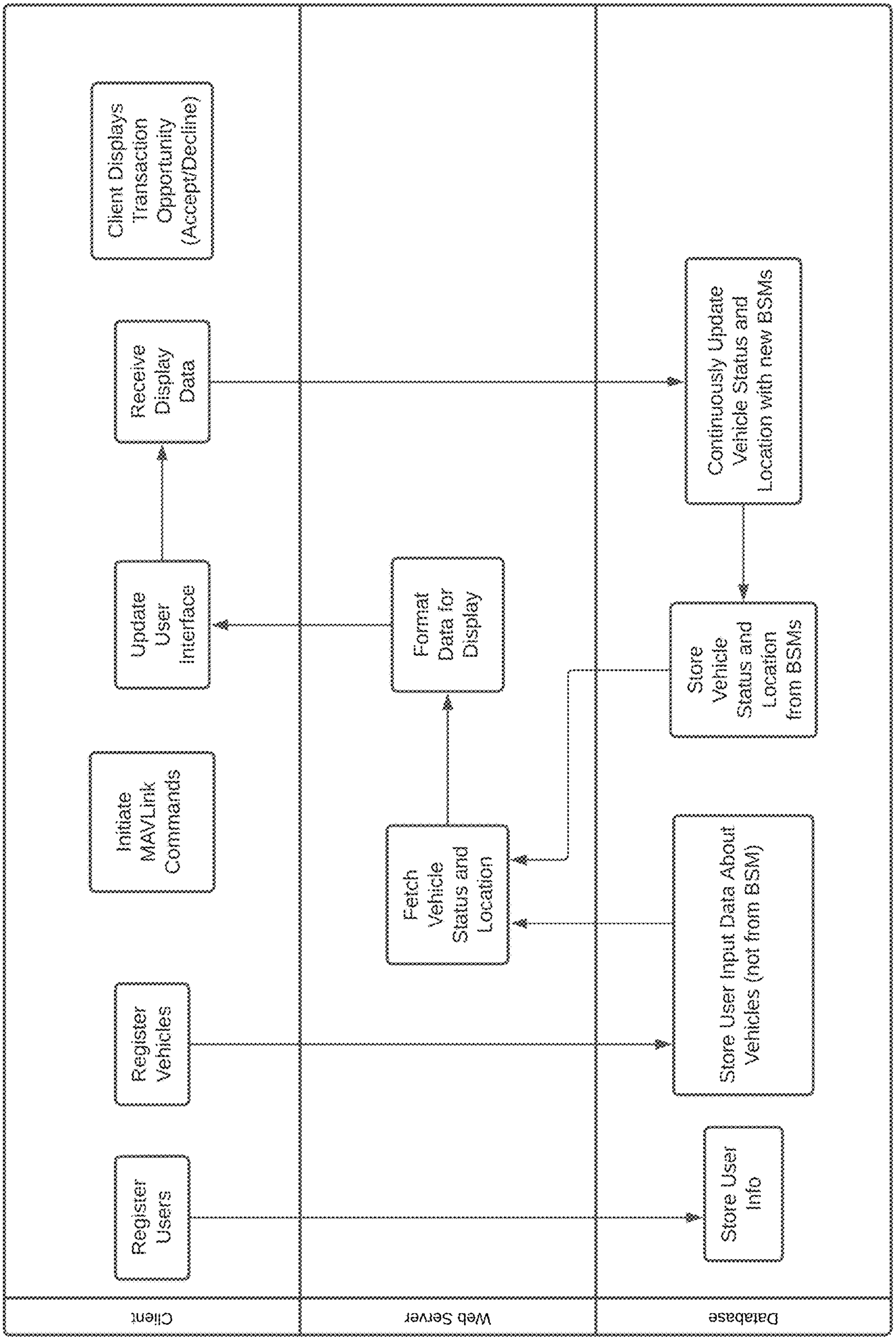
FIG. 15 is a diagram showing high-level data flow of multiple client operations in coordination with a server and database.

In one embodiment, the server infrastructure manages incoming data streams from the database and provides client-facing services for visualization and control. See FIG. 15. The database receives and stores data from BSMs, including OBU status and location. Upon request, the server retrieves the stored information, formats it, and delivers it to the client for display. Because BSM data from OBUs is continuously sent to the database, the client interface provides users with near-real-time awareness of the status and location of vehicles or devices associated with OBUs. In one embodiment, clients update stored information through a user interface, with the server processing these updates and modifying the corresponding database records.

In one embodiment, the client provides a registration interface for users. Users may be classified according to entity type (e.g., commercial operator, emergency responder, or private owner), with preset priorities or privileges applied based on the classification. Information about registered users is stored in the database for coordination with other system functions. The client may also register vehicles or devices associated with OBUs, including make, model, license number, unique private identifiers, OBU identifiers, failsafes, sensors, and ownership details. This registration data is stored in the database and cross-referenced with incoming BSMs to maintain status tracking of registered vehicles.

Figure 16:
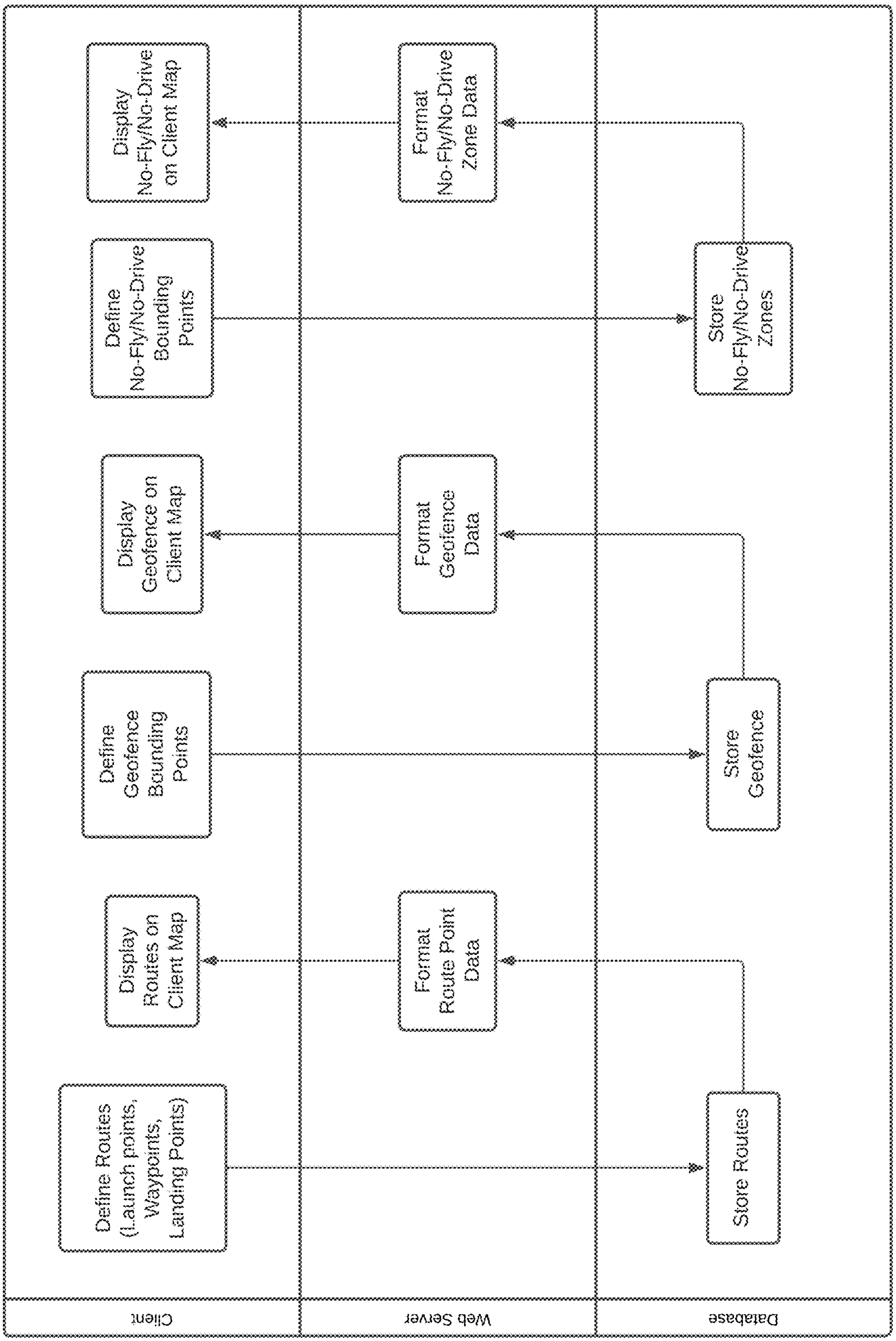
FIG. 16 is a diagram showing high-level data flow of operating procedures for defining and displaying routes, geofences, and no-fly/no drive zones.

In one embodiment, the client enables users to define routes consisting of launch points, waypoints, and landing points, thereby specifying the intended travel path of a vehicle. See FIG. 16. The UTM maintains a master set of routes that reflect infrastructure owner-operator preferences, community preferences, geofence boundaries, and designated keep-out zones. These routes may be used by the system to guide vehicles from origin to destination while enforcing operational rules such as safe operating speeds, minimum vehicle separation, and conflict-free passage at intersections of established routes. Route data is stored in the database and processed by the server for rendering on a map display within the user interface, where it may be coordinated with user-defined or system-assigned routing options.

In one embodiment, the client enables users to define geofences by specifying bounding points on a map. See FIG.

16. The geofences are stored in the database. The server processes and formats this geofence data for display in the user interface, allowing users to visualize permitted operational boundaries. Geofences may be expressed as two-dimensional areas or three-dimensional spaces and may be used to define corridors or operating envelopes for OBUs. The system continuously compares incoming BSM data with stored geofence definitions. When an OBU approaches or attempts to cross a geofence boundary, the system may issue warnings, trigger automated adjustments to the OBU's route, or transmit control commands to maintain the OBU within the authorized operating area.

Figure 17:
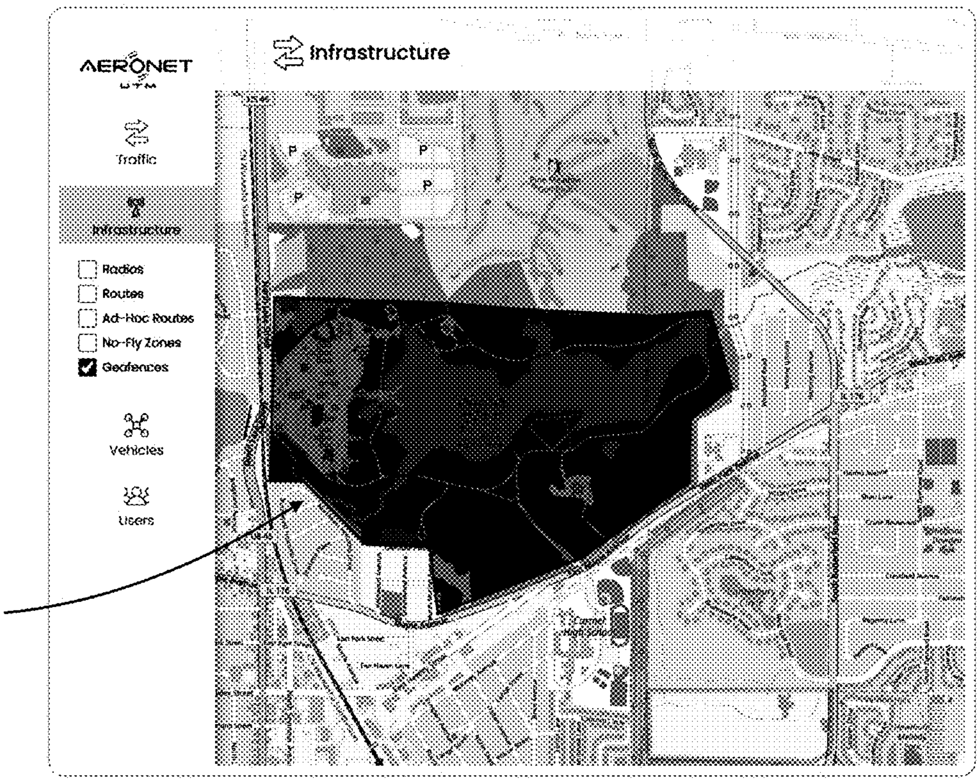
FIG. 17 illustrates a map with a no-fly or no-drive zone.

In one embodiment, the client enables users to define no-travel zones, no-fly (air) or no-drive (ground) zones, by specifying bounding points on a map. See FIG. 16. The no-fly/no-drive zones are stored in the database. The server processes and formats this no-fly/no-drive zone data for display within the user interface, thereby providing a visual representation of restricted areas. No-fly/no-drive zones may be expressed as two-dimensional areas or three-dimensional spaces and may correspond to sensitive or restricted regions such as government facilities, airports, schools, or hazardous environments. FIG. 17 shows a user interface display map 1700 with a no-fly/no-drive zone 1701 covering the campus of a university. The system compares incoming BSM data with stored no-fly/no-drive zone definitions to ensure that OBUs are prevented from traversing into prohibited areas.

Transactions

Figure 18:
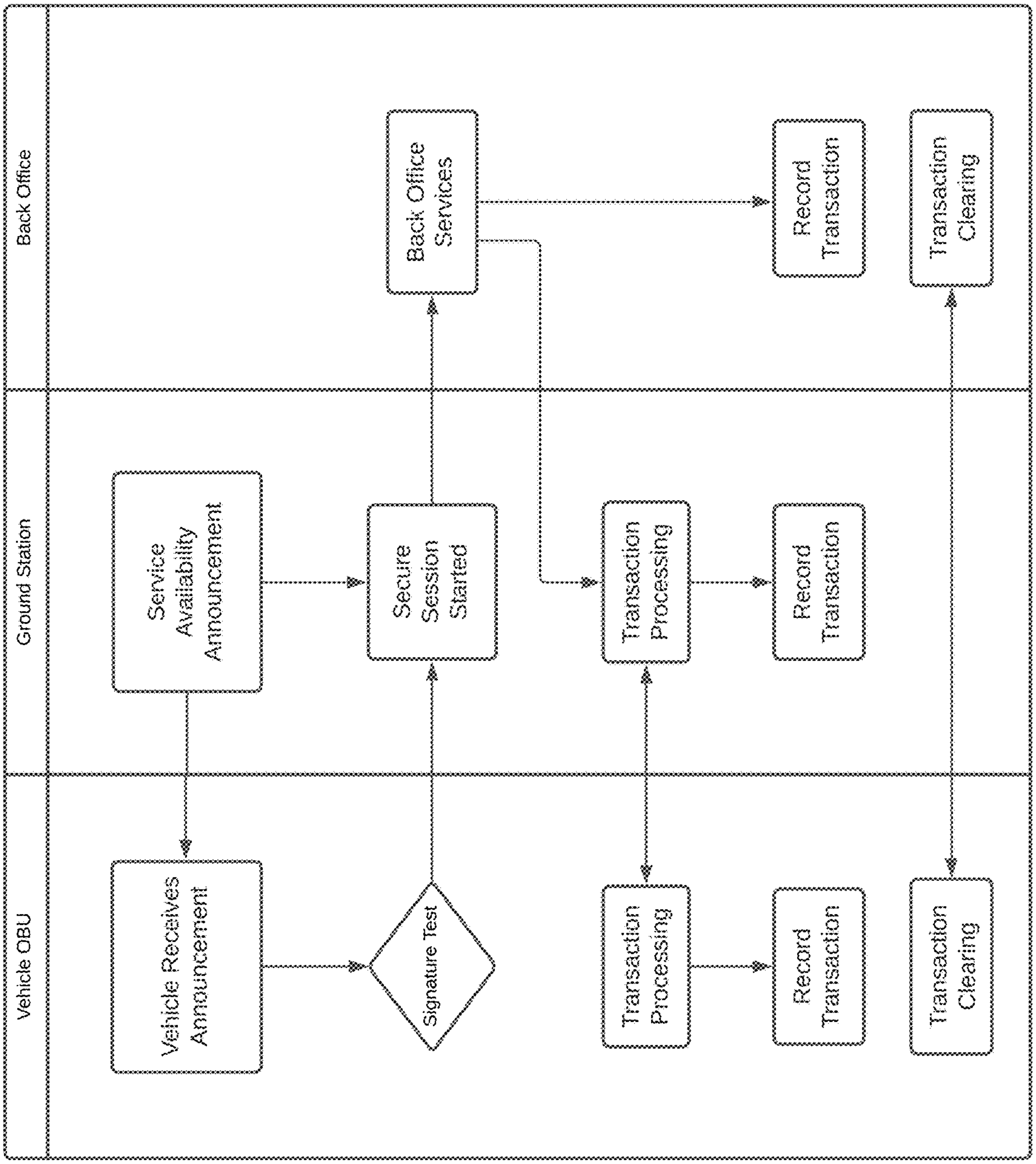
FIG. 18 is a diagram showing high-level data flow for transactions.

In one embodiment, vehicle OBUs are equipped to engage in secure transactions with other OBUs or with Ground Stations. See FIG. 18 for data flow processes regarding transactions between OBUs and Ground Stations. A transaction is a choreographed data exchange between a vehicle operator and a service provider that accomplishes a specific function, such as purchasing a good, paying a toll, opening a gate, or accessing a restricted facility. By enabling a standardized framework for transactions, the system provides users with a consistent experience across different vehicles, locations, and purposes. For example, parking payments, building access, or vehicle mileage usage fees could all be completed through the same process flow, regardless of where the vehicle is located, thereby enabling a seamless, scalable operating environment.

In one embodiment, Ground Stations act as facilitators of transactions. Ground Stations may communicate as C-V2X short-range access points or as cellular base stations. Regardless of the underlying physical medium, the process flow, data dialog, and cryptographic protections remain consistent, ensuring a uniform user experience. To initiate a transaction, a Ground Station or OBU first announces the availability of a transaction service. This announcement functions much like a digital signpost, informing nearby vehicles or OBUs that a transaction opportunity is available.

Upon receiving such an announcement, in one embodiment, a vehicle OBU establishes a secure session with the Ground Station in preparation for the transaction. The OBU performs a signature verification test to ensure that the announcement originates from an authenticated source. If the signature test passes, the OBU enters the transaction process. At this stage, a Back Office service creates a transaction record, which is transmitted to the Ground Station for coordination. Transaction details are then securely shared between the Ground Station and the OBU, where both endpoints process and record the exchange for non-repudiation. The Back Office maintains a complete record of all transaction data and transmits relevant details to the client system. In some embodiments, the client presents the transaction opportunity to the user in a graphical interface, where the user may accept or decline the transaction in real time.

Traveler Information Message and MAVLink

Figure 19:
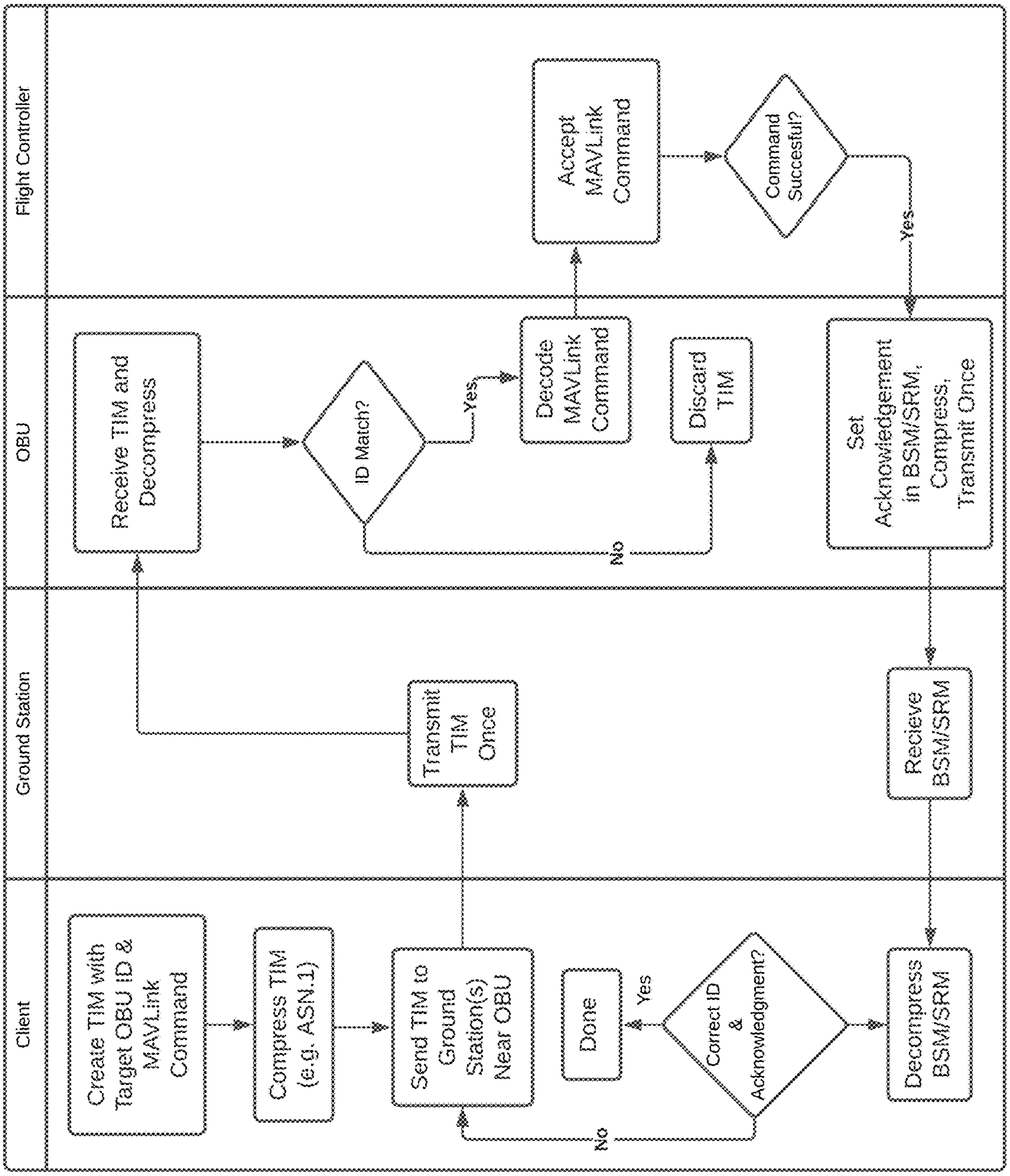
FIG. 19 is a diagram showing high-level data flow for TIM and MAVLink Commands.

In one embodiment, TIMs are implemented as travel commands. In one embodiment, the travel commands are MAVLink commands to enable coordinated, secure, and verifiable communication between clients, Ground Stations, and OBUs. See FIG. 19 for data flow processes regarding MAVLink Commands. A TIM is an SAEJ2735 message with broad uses, including the ability to send text strings. The SAEJ2735 standard was developed to send broadcast public messages over DSRC, specifically to utilize the text strings to send legible messages to all humans in range, regarding travel conditions. In one embodiment, the text strings are utilized to send private, targeted, machine executable messages directing flight commands. In one embodiment, text strings are converted to flight controller command protocol (MAVLink) messages in the OBU. Through this system, clients can initiate MAVLink or similar flight or vehicle controller commands to transmit routing instructions, geofences, no-fly/no-drive zones, or other operational directives to targeted OBUs.

In one embodiment, the client generates a TIM message with a target OBU ID and corresponding MAVLink text strings. The TIM is then compressed to optimize bandwidth and forwarded to one or more Ground Stations located near the vehicle, based on its most recent position as reported in BSMs. Upon reception, the Ground Station transmits the TIM once to the OBU. The OBU receives the compressed TIM, decompresses it, and checks the target OBU ID. If the TIM ID does not match the OBU, the message is discarded. If the ID matches, the MAVLink command is decoded and sent to the vehicle's flight controller for execution.

In one embodiment, the flight controller executes the MAVLink command, and upon successful execution, generates an acknowledgment message, which is sent back to the OBU via a BSM or Signal Request Message (SRM). In an alternative embodiment, the acknowledgement message is sent through an encrypted User Datagram Protocol (UDP) or Transmission Control Protocol (TCP) socket. The OBU compresses the BSM or SRM and transmits it to a nearby Ground Station, which decompresses the message, verifies the ID and acknowledgment, and forwards confirmation to the client. If no acknowledgment is received within a time limit, the client is notified that the command has not yet been executed, and the TIM is retransmitted once again from the Ground Station. This process continues until the MAVLink command is successfully executed or the client chooses to dismiss the TIM, ensuring reliable, verifiable, and near-real-time control over vehicle operations.

In one embodiment, this TIM-MAVLink transport process provides end-to-end traceability, allowing the client to confirm that operational directives were received and performed as intended. The use of compression (e.g. ASN.1), BSM reporting, and secure ID verification ensures efficient communication, minimizes redundant transmissions, and maintains system security.

Use Cases

In one embodiment, the system supports multiple use case scenarios across air and ground transportation modes. For urban airport coordination, airliners, general aviation aircraft, drones, and ground support vehicles such as tugs communicate through C-V2X messages to ensure safe, efficient, and coordinated movements within the airport environment. In smart city delivery operations, drones transporting packages coordinate with eVTOL taxis and ground traffic to optimize routes, avoid congestion, and maintain safety in densely populated urban areas. For counter-drone security, the system distinguishes authorized from unauthorized drones using cryptographic IDs, enabling detection, tracking, and management of uncooperative or potentially hazardous aerial vehicles.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventor intended that that feature or function may be deployed, utilized or implemented in connection with the alternative embodiment unless the feature or function is incompatible with the alternative embodiment.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer.

These computer program instructions can direct a computing device or other programmable data processing apparatus to function in a particular manner, such that the instructions stored in the computer-readable medium produce an article of manufacture including instruction means which implement the function/operation specified in the illustrated process flows.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a wired or wireless LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method of controlling travel of at least one vehicle, comprising:

creating, by processing circuitry of at least one client device, a Traveler Information Message (TIM) comprising a text string;

inserting, by the processing circuitry of the at least one client device, a travel command into the text string within the TIM;

inserting, by the processing circuitry of the at least one client device, a target identifier for an on-board unit mounted to the at least one vehicle into the text string within the TIM;

compressing, by the processing circuitry of the at least one client device, the TIM;

encoding, by the processing circuitry of the at least one client device, the TIM;

transmitting, by the processing circuitry of the at least one client device, the TIM to at least one ground station;

transmitting, by a system-on-a-chip of the at least one ground station, the TIM to the at least one vehicle;

receiving, by a system-on-a-chip of the at least one vehicle, the TIM;

decoding, by a system-on-a-chip of the at least one vehicle, the TIM to verify that the target identifier matches an identifier for the on-board unit mounted to the at least one vehicle;

decompressing, by the system-on-a-chip of the at least one vehicle, the TIM;

extracting, by the system-on-a-chip of the at least one vehicle, the travel command from the text string within the TIM;

transmitting, by the system-on-a-chip of the at least one vehicle, the travel command to a flight controller of the at least one vehicle; and executing, by the flight controller of the at least one vehicle, the travel command.

2. The method of claim 1, wherein the TIM is an SAE J2735 standard message.

3. The method of claim 1, wherein the compressing uses Abstract Syntax Notation One (ASN.1).

4. The method of claim 1, wherein the at least one vehicle is a ground vehicle.

5. The method of claim 1, wherein the at least one vehicle is an aerial vehicle.

6. The method of claim 1, wherein the travel command is a MAVLink command.

7. The method of claim 1, further comprising:

transmitting, by the system-on-a-chip of the at least one ground station, the TIM to a plurality of on-board units mounted on a plurality of vehicles.

8. The method of claim 1, wherein the travel command is a route.

9. The method of claim 8, wherein the route is on the ground.

10. The method of claim 8, wherein the route is in the air.

11. The method of claim 1, wherein the travel command is a geofence.

12. The method of claim 1, wherein the travel command is a no travel zone.

13. The method of claim 1, wherein the travel command is a destination.

14. The method of claim 1, further comprising transmitting, by the system-on-a-chip of the at least one vehicle, a basic safety message (BSM) to the at least one ground station.

15. The method of claim 14, wherein the BSM is comprised of information about the at least one vehicle, including location, direction, speed, and acceleration, and a timestamp recording the time of transmitting the BSM.

16. The method of claim 14, wherein the BSM is comprised of a rotating identification of the at least one vehicle.

17. The method of claim 14, further comprising the step of compressing the BSM using Abstract Syntax Notation One (ASN.1).

18. The method of claim 14, further comprising transmitting, by a system-on-a-chip of a second vehicle, a BSM to the at least one ground station; and wherein the travel command transmitted within the TIM to the flight controller of the at least one vehicle is a collision avoidance maneuver based on the BSM transmitted by the system-on-a-chip of the second vehicle.

19. The method of claim 1, further comprising transmitting, by the system-on-a-chip of the at least one vehicle, a basic safety message (BSM) from the at least one vehicle to a second vehicle.

20. The method of claim 19, further comprising executing, by a flight controller of the second vehicle, a collision avoidance maneuver based on the BSM transmitted from the at least one vehicle to the second vehicle.

21. A method of controlling travel of at least one aerial vehicle, comprising:

creating, by processing circuitry of at least one client device, a Traveler Information Message (TIM) comprising a text string;

inserting, by the processing circuitry of the at least one client device, a travel command into the text string within the TIM;

compressing, by the processing circuitry of the at least one client device, the TIM;

transmitting, by the processing circuitry of the at least one client device, the TIM to at least one ground station;

transmitting, by a system-on-a-chip of the at least one ground station, the TIM to the at least one aerial vehicle;

receiving, by a system-on-a-chip of the at least one aerial vehicle, the TIM;

decompressing, by the system-on-a-chip of the at least one aerial vehicle, the TIM;

extracting, by the system-on-a-chip of the at least one aerial vehicle, the travel command from the text string within the TIM;

transmitting, by the system-on-a-chip of the at least one aerial vehicle, the travel command to a flight controller of the at least one aerial vehicle; and executing, by the flight controller of the at least one aerial vehicle, the travel command.

22. The method of claim 21, further comprising:

inserting, by the processing circuitry of the at least one client device, a target identifier for an on-board unit mounted to the at least one aerial vehicle into a text string within the TIM;

encoding, by the processing circuitry of the at least one client device, the TIM; and decoding, by a system-on-a-chip of the at least one aerial vehicle, the TIM to verify that the target identifier matches an identifier for the on-board unit mounted to the at least one aerial vehicle.

23. The method of claim 21, wherein the compressing uses Abstract Syntax Notation One (ASN.1).

24. The method of claim 21, wherein the travel command is a MAVLink command.

25. The method of claim 21, further comprising transmitting, by the system-on-a-chip of the at least one aerial vehicle, a basic safety message (BSM) to the at least one ground station.

26. The method of claim 25, wherein the BSM is comprised of a rotating identification of the at least one aerial vehicle.

27. The method of claim 25, further comprising the step of compressing the BSM using Abstract Syntax Notation One (ASN.1).

* * * * *